April 21, 1931.    J. BURKHARDT    1,801,656
MOVING PICTURE FILM
Filed Sept. 18, 1929
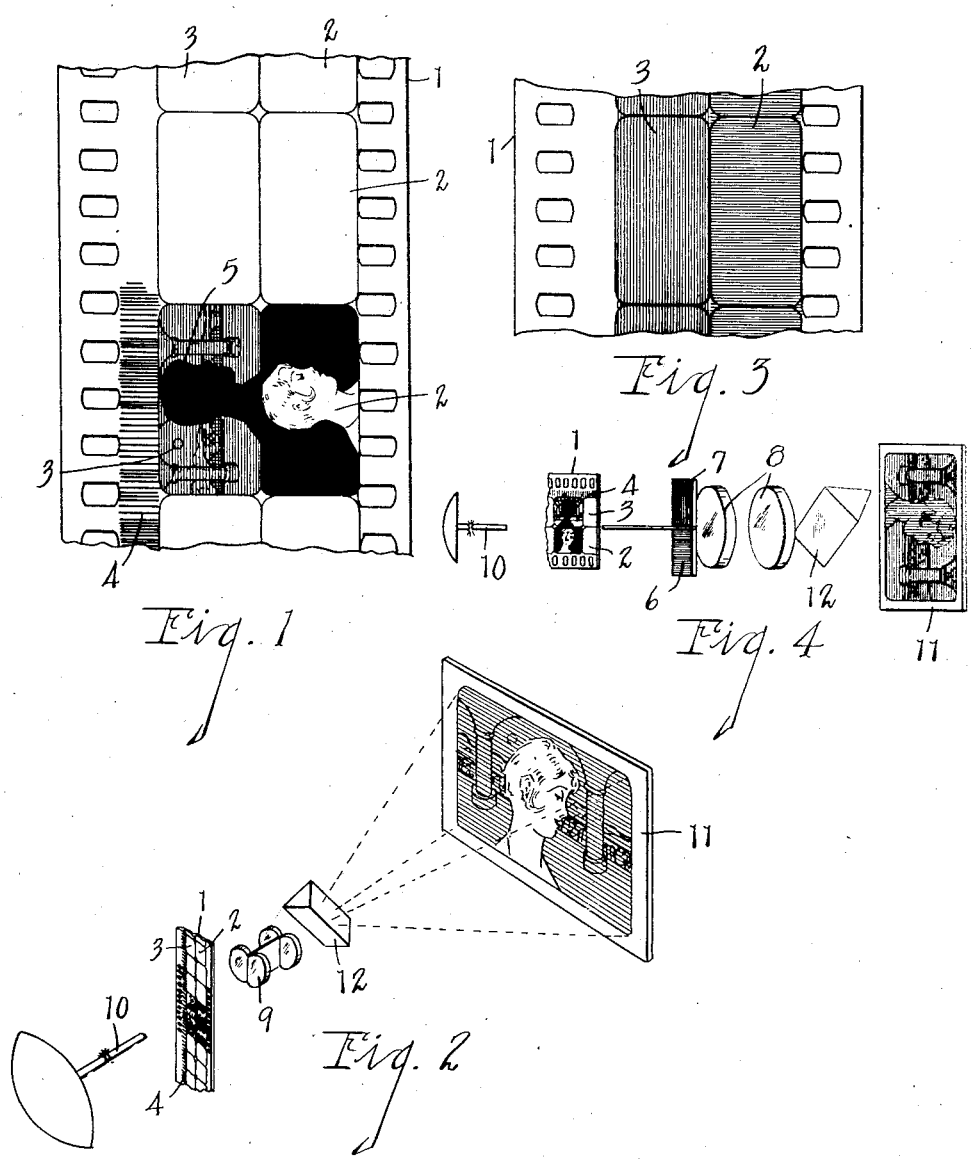
INVENTOR
Jakob Burkhardt
BY Chappell & Earl
ATTORNEYS Patented Apr. 21, 1931

1,801,656

UNITED STATES PATENT OFFICE

JAKOB BURKHARDT, OF DETROIT, MICHIGAN, ASSIGNOR TO THIRD DIMENSION PICTURES, INC., OF NEW YORK, N. Y.

MOVING-PICTURE FILM

Application filed September 18, 1929. Serial No. 393,368.

The main object of this invention is to provide a motion picture film for producing pictures having the appearance of relief or third dimension in which the effect sought is very pronounced and the pictures are clear and distinct.

Objects pertaining to details and economies of my invention will definitely appear from the description to follow. The invention is defined in the claims.

A moving picture film illustrating the features of my invention is clearly illustrated in the accompanying drawing, in which:

Fig. 1 is a fragmentary plan view of a moving picture film embodying the features of my invention.

Fig. 2 is a perspective view mainly in conventional form illustrating a suitable apparatus or equipment for projecting pictures from the film.

Fig. 3 is a fragmentary plan view illustrating an embodiment of my invention in which the associated sections of the film are contrastingly colored.

Fig. 4 is a perspective view mainly in conventional form of a modified embodiment of my invention showing means for producing color effects and enhancing the relief or third dimension effects.

In the embodiment illustrated in Fig. 1 the film designated generally by the numeral 1 is provided with a series of foreground pictures 2, preferably action or image pictures, only one being illustrated, and a series of background pictures 3 suitable as backgrounds for the foreground or action pictures.

These foreground and action pictures are both miniatures, that is, they are reduced in size so that two or more of them may be arranged in the frame space of a standard film, and in the embodiment illustrated are further reduced to provide space for a sound record 4 disposed longitudinally of the film.

The pictures are arranged transversely of the film with the top of the image or action picture at the center of the film and the bottom of the background picture at the center; that is, the top of the foreground pictures and the bottom of the background pictures are adjacent.

Each background picture has a mask 5 thereon of the foreground or image picture of the pair, this mask being preferably in solid "black" as it is termed in the art, so that when a pair of pictures is projected in superimposed relation upon a screen the foreground picture will register with the background mask and the light from the background does not show through the foreground picture.

I preferably color either one or both of the background and foreground portions of the film. In Figs. 1 and 2 the background portion is colored. In Fig. 3 both the background and foreground portions of the film are colored, while in Fig. 4 the contrasting colors in the foreground and background are provided by means of filters 6 and 7 interposed between the film and the lenses conventionally shown at 8.

In projecting the pictures I employ projecting machines having double lenses 9, that is, lenses arranged in pairs as shown in Fig. 2, the light being indicated at 10 and the screen at 11.

Owing to the pictures being disposed transversely of the film, I provide a refracting prism 12 disposed in front of the lenses so that the pictures are presented in an upright position on the screen.

In the modification shown in Fig. 4 the refracting prism is also employed.

By arranging the pictures transversely of the film in coacting pairs with the top of the image picture and the bottom of the background picture at the center of the film, the portion of the foreground picture ordinarily requiring the highest illumination is brought into the zone of greatest illumination, while the lower portion of the background picture, which is the part it is desirable should receive the greatest illumination, is brought into this zone.

By employing color on either the foreground or background portions of the picture, or both, the stereoscopic or third dimensional effect is increased. The coloring may be done by tinting the entire background portion of the reverse side of the film as shown in Figs. 1 and 2, or both the background and foreground portions as shown in Fig. 3. This method is preferred to the use of color screens as the tinted films offer less obstruction to the light.

My present improvements are an adaptation of and in some respects an improvement upon the invention of my application for Letters Patent filed April 22, 1929, Serial No. 357,146.

I have not attempted to illustrate and describe various adaptations of my invention as it is believed that this disclosure will enable those skilled in the art to embody or adapt the same as may be desired.

Having thus described my invention what I claim as new and desire to secure by Letters Patent is:

1. A moving picture film comprising a background picture and a series of image pictures, both disposed transversely of a film and in coacting pairs side by side transversely of the film with the top of the image picture and the bottom of the background picture toward the center of the film, both background and foreground pictures being in miniature and of such size that each pair of pictures is within the space of a standard film frame, the background picture having a mask of the image picture of the pair and the image and background portions of the film being contrastingly colored.

2. A moving picture film comprising a background picture and a series of image pictures, both disposed transversely of a film and in coacting pairs side by side transversely of the film with the top of the image picture and the bottom of the background picture toward the center of the film, both background and foreground pictures being in miniature and of such size that each pair of pictures is within the space of a standard film frame, the background picture having a mask of the image picture of the pair.

3. A moving picture film comprising a background picture and a series of image pictures, both disposed transversely of a film and in coacting pairs side by side transversely of the film, both background and foreground pictures being in miniature and of such size that each pair of pictures is within the space of a standard film frame, the background picture having a mask of the image picture of the pair and the image and background portions of the film being contrastingly colored.

4. A moving picture film comprising a background picture and a series of image pictures both disposed transversely of a film and in coacting pairs side by side transversely of the film with the top of the image picture and the bottom of the background picture toward the center of the film, both background and foreground pictures being in miniature and of such size that each pair of pictures is within the space of a standard film frame, the image and background portions of the film being contrastingly colored.

5. A motion picture film comprising a series of miniature background pictures and a series of miniature foreground pictures disposed side by side transversely of the film with the tops of the foreground pictures and the bottoms of the background pictures toward the center of the film the background pictures of each pair having thereon a mask of the foreground picture of the pair, the background and foreground portions of the film being contrastingly colored.

6. A motion picture film comprising a series of miniature background pictures and a series of miniature foreground pictures disposed side by side transversely of the film with the tops of the foreground pictures and the bottoms of the background pictures toward the center of the film, the background pictures of each pair having thereon a mask of the foreground picture of the pair.

7. A moving picture film comprising a series of background pictures and a series of foreground pictures disposed in coacting pairs side by side transversely of the film, each background picture having a mask of the foreground picture of the pair, the background portion of the film being colored.

8. A motion picture film comprising a series of miniature background pictures and a series of miniature foreground pictures disposed side by side transversely of the film, the background pictures of each pair having thereon a mask of the foreground picture of the pair, the background and foreground portions of the film being contrastingly colored.

9. A moving picture film comprising a series of background pictures and a series of foreground pictures disposed in coacting pairs side by side transversely of the film, each background picture having a mask of the foreground picture of the pair, one portion of the film being colored.

10. A moving picture film comprising a series of background pictures and a series of foreground pictures disposed in coacting pairs side by side transversely of the film with the tops of the foreground pictures and the bottoms of the background pictures toward the center of the film, the background pictures having thereon masks of the associated foreground pictures.

11. A moving picture film comprising a series of miniature background pictures disposed longitudinally of the film, and a series of miniature foreground pictures disposed longitudinally of the film with the foreground and background pictures in coacting pairs, the background picture of each pair having thereon a mask of the foreground picture of the pair, the background series portion of the film being colored.

12. A moving picture film comprising a series of miniature background pictures disposed longitudinally of the film, and a series of miniature foreground pictures disposed longitudinally of the film with the foreground and background pictures in coacting pairs, the background picture of each pair having thereon a mask of the foreground picture of the pair, one series of pictures being colored.

13. A moving picture film comprising a series of background pictures and a series of foreground pictures arranged in coacting pairs side by side transversely of the film and contrastingly colored, the background pictures having masks of their associated foreground pictures.

In witness whereof I have hereunto set my hand.

JAKOB BURKHARDT.